United States Patent Office 3,639,406
Patented Feb. 1, 1972

3,639,406
3-AMINO-s-TRIAZOLO[3,4-a]ISOQUINOLINES
Hans K. Reimlinger, Brussels, and Jan Joseph Maurice Vandewalle, Mortsel, Belgium, assignors to Union Carbide Corporation, New York, N.Y.
No Drawing. Continuation-in-part of application Ser. No. 634,077, Apr. 27, 1967. This application July 10, 1968, Ser. No. 743,619
Int. Cl. C07d 35/36
U.S. Cl. 260—288          1 Claim

ABSTRACT OF THE DISCLOSURE 3-amino-s-triazolo[3,4-a]isoquinolines are prepared by several methods. First, they are prepared by reacting a 1-hydrazino-s-triazolo[3,4-a]isoquinoline with a dichloromethylene acylamine to produce an intermediate compound which is then hydrolyzed with aqueous base or acid. Second, they are produced by reacting a 1-hydrazinoisoquinoline with an alkylthiouronium salt. Third, they are produced by reacting a 1-chloroisoquinoline with 5-aminotetrazole. And fourth, they are produced by reacting a 1-hydrazino-isoquinoline with cyanogen bromide. The 3-amino-s-triazolo[3,4-a]isoquinolines can be hydrogenated to 5,6-dihydro-3-amino-s-triazolo[3,4-a]isoquinolines. The compounds of the invention are useful as corrosion inhibitors, as acid acceptors, and as reaction intermediates in preparing surfactants, plastics and other useful compositions.

---

This application is a continuation-in-part of copending application Ser. No. 634,077, filed Apr. 27, 1967 for "s-Triazolo[3,4-a]isoquinolines and Derivatives Thereof" by Hans K. Reimlinger and Jan J. M. Vandewalle, now abandoned.

The invention relates to 3-amino-s-triazolo[3,4-a]isoquinolines and to several methods for making them. In one aspect, the invention relates to the 3-amino-s-triazolo[3,4-a]isoquinolines as compositions of matter. In another aspect, the invention relates to a process for preparing them which comprises reacting a 1-hydrazinoisoquinoline with a dichloromethylene acylamine to form a 3-N-acylamino-s-triazolo[3,4-a]isoquinoline which is then hydrolyzed to form the desired 3-amino compound. The invention also relates to a process which comprises reacting a 1-hydrazinoisoquinoline with an alkylthiouronium salt in aqueous medium to form a 3-amino-s-triazolo[3,4-a]isoquinoline. A further aspect of the invention comprises a process wherein a 1-chloroisoquinoline is reacted with aminotetrazole to form a 3-amino-s-triazolo[3,4-a]isoquinoline.

3-amino-s-triazolo[3,4-a]isoquinolines are compounds that have the following basic structure:

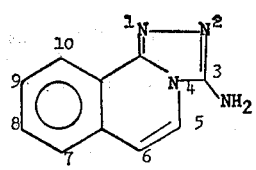

These compounds can be made by several processes. The first process involves the following two reactions:

(a) Reaction of a 1-hydrazinoisoquinoline with a dichloromethylene acylamine to form a 3-(N-acylamino)-s-triazolo[3,4-a]isoquinoline:

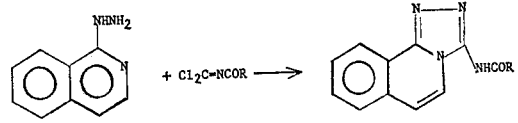

wherein R represents alkyl or aryl.
(b) hydrolysis of the product of reaction (a):

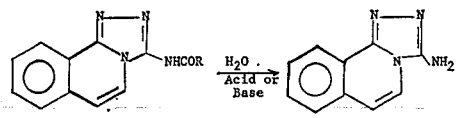

A second process for producing 3-amino-s-triazolo[3,4-a]isoquinolines is illustrated by reaction (c) wherein a 1-hydrazinoisoquinoline is reacted with an alkylthiouronium salt:

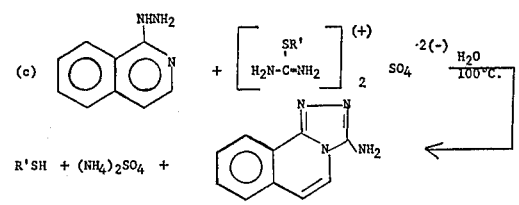

wherein R' represents alkyl.

A third process for producing 3-amino-s-triazolo[3,4-a]isoquinolines is illustrated by reaction (d) wherein a 1-chloroisoquinoline is reacted with 5-aminotetrazole:

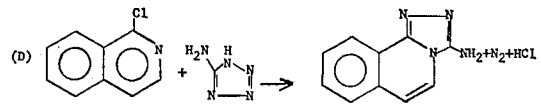

The 3-amino-s-triazolo[3,4-a]isoquinolines of the invention can also be produced by reacting a 1-hydrazinoisoquinoline with cyanogen bromide, as is shown in reaction (e):

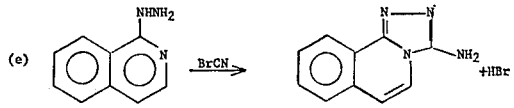

The starting reactants in reactions (a), (c), (d) and (e) are 1-hydrazinoisoquinolines and 1-chloroisoquinolines. The 1-hydrazinoisoquinolines can be produced by the known reaction of hydrazine with a 1-chloroisoquinoline:

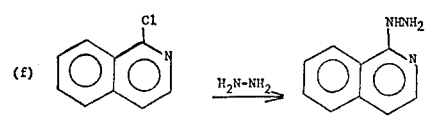

In the event that the 1-chloroisoquinoline has one or more additional chloro substituents, reaction (f) is preferably carried out in methanol since 1-hydrazinoisoquinolines, which form first, are quite insoluble in methanol. Thus, by precipitation of the 1-hydrazinoisoquinoline, the preparation of polyhydrazino derivatives is avoided.

1-chloroisoquinolines comprise a known class of compounds. Among the 1-chloroisoquinolines that can be used, either as a reactant in reaction (d) or as a reactant to prepare 1-hydrazinoisoquinolines, are the following compounds:

1-chloroisoquinoline,
1,3-dichloroisoquinoline,
1,4-dichloroisoquinoline, 1,4-dichloro-3-methylisoquinoline,
1-chloro-3-phenylisoquinoline,
1,4-dichloro-3-phenylisoquinoline,
1,5-dichloroisoquinoline,
1,7-dichloroisoquinoline,
1-chloro-5-methoxyisoquinoline,
1-chloro-6-methoxyisoquinoline,
1-chloro-3-(chloromethyl)-4-methylisoquinoline,
1-chloro-3,4-dimethylisoquinoline,
1-chloro-3-ethyl-4-phenylisoquinoline,
1-chloro-3-methyl-4-phenylisoquinoline,
1-chloro-4-nitroisoquinoline,
1-chloro-4-ethoxyisoquinoline,
1-chloro-4-butoxyisoquinoline,
1-chloro-7-methoxyisoquinoline,
1-chloro-3-ethylisoquinoline,
1-chloro-5,6,7-trimethoxyisoquinoline,
1-chloro-6,7-dimethoxyisoquinoline,
1-chloro-3-methyl-4-cyanoisoquinoline,
1-chloro-4-carbethoxyisoquinoline,
1-chloro-7-methylisoquinoline,
1-chloro-6,7,8-trimethoxyisoquinoline,
1,7-dichloro-3-methylisoquinoline,
1-chloro-1,3-dioxolo[4,5-g]isoquinoline,
1-chloro-3-butylisoquinoline,
1-chloro-4-methylisoquinoline, and the like.

The foregoing illustrative 1-chloroisoquinolines are either known or are readily available by known reactions such as the reaction of phosphorus oxychloride with the corresponding isocarbostyril in accordance with the following illustrative reaction:

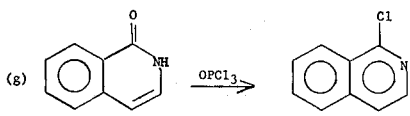

Isocarbostyrils are known, and methods for their production are known. A useful new method for producing isocarbostyrils is to boil a styryl isocyanate in diphenyl ether in accordance with the following reaction:

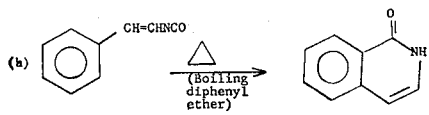

Styryl isocyanates can be produced by known reactions from the corresponding benzaldehydes. The benzaldehyde is used to prepare a cinnamic acid (for instance, by reaction with malonic acid) which is transformed into the cinnamoyl chloride by reaction with thionyl chloride. The cinnamoyl chloride is reacted with sodium azide to form the cinnamoyl azide, which is heated to form the styryl isocyanate via the Curtius rearrangement.

In one aspect of the invention there is provided a process which comprises reacting a 1-hydrazinoisoquinoline with a dichloromethylene acylamine for a period of time and at a temperature sufficient to form a 3 - (N - acylamino) - s - triazolo[3,4-a]isoquinoline which is then hydrolyzed to the 3-amino-s-triazolo[3,4-a]isoquinoline.

Dichloromethylene acylamines are known to the art. For instance, their preparation is disclosed by Johnson et al., J. Am. Chem. Soc. 34, 164 (1912) and by Burkhardt et al., Chem. Ber. 99 (6), 1912–1917 (1966). While a wide variety of dichloromethylene acylamines can be used, it is preferred to use the cheapest and most readily available such as dichloromethylene benzamide and dichloromethylene acetamide. Other dichloromethylene acylamides that can be used include dichloromethylene propionamide, dichloromethylene butyramide, and other dichloromethylene alkanoylamides of up to 12 carbon atoms. Additional dichloromethylene aroylamides that can be used include dichloromethylene methylbenzoylamide, dichloromethylene ethylbenzoylamide, dichloromethylene butylbenzoylamide, and others having up to 12 carbon atoms.

The reaction of a -hydrazinoisoquinoline with the dichloromethylene acylamine can conveniently be carried out by contacting the two reactants in an inert solvent which preferably contains a base such as a tertiary amine to take up the hydrochloric acid that is produced as a by-product Suitable bases for this purpose include trimethylamine, triethylamine, tripropylamine, and the like. Useful inert solvents include one or more organic liquids such as ethyl acetate, butyl acetate, methyl ethyl ketone, diisobutyl ketone, tetrahydrofuran, dioxane, dimethyl sulfoxide, and the like. One way to carry out the reaction is to slowly add the reactants to a solution of tertiary amine in inert solvent, followed by a brief heating period to insure essentially complete reaction. The reaction time is not critical since the reaction proceeds almost instantaneously. Thus, after the addition, a brief heating period of from about to about 30 minutes at a temperature of from about 50° to about 100° C. is all that is required. The product can be recovered by cooling the reaction mixture to precipitate the product, washing with water to remove hydrochloride salt and excess base, followed by recrystallization from a suitable solvent such as pyridine.

The reactants can be employed in about a 1:1 molar ratio, although it is generally preferred to employ an excess (e.g., up to 100 mole percent or more) of the dichloromethylene acylamine. It is preferred to use a slight stoichiometric excess (e.g., up to 10 mole percent) of base in order to avoid the production of the more water-soluble hydrochloride salt of the desired product, since it is also basic, although not as strongly basic as a trialkylamine.

The 3 - (N - acylamino)-s-triazolo[3,4-a]isoquinoline is then hydrolyzed under conventional hydrolysis conditions to produce the 3-amino-s-triazolo[3,4-a]isoquinoline. The hydrolysis can be carried out, for instance, by refluxing the 3-(N-acylamino)-s-triazolo[3,4-a]isoquinoline in strong, aqueous hydrochloric acid until hydrolysis is complete (usually from about 1 to 3 hours). The reaction mixture is then cooled, neutralized with a base such as sodium bicarbonate, and the product recovered from the aqueous mixture by extraction with an organic solvent such as diethyl ether. The pure product can then be recovered by evaporation of the ether. Alternatively, conventional alkaline hydrolysis conditions can be used instead of the above-exemplified acid hydrolysis.

Another aspect of the invention provides a process which comprises reacting a 1-hydrazinoisoquinoline with an alkylthiouronium salt for a period of time and at a temperature sufficient to produce a 1-amino-s-triazolo-[3,4-a]isoquinoline. Alkylthiouronium salts are known compounds that can be produced by the following reaction:

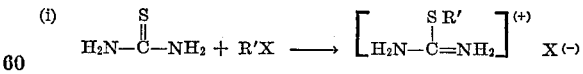

wherein R' represents alkyl of from 1 to 12 carbon atoms and preferably of from 1 to 4 carbon atoms, and wherein X represents an anion such as sulfate, halide, or the like. Useful alkylthiouronium salts include methylthiouronium sulfate,
methylthiouronium chloride,
ethylthiouronium sulfate,
butylthiouronium chloride,
octylthiouronium sulfate,
decylthiouronium sulfate, and the like. Methylthiouronium sulfate is preferred.

The reaction can be conveniently carried out by refluxing a mixture of a 1-hydrazinoisoquinoline with an alkylthiouronium salt in water for a period of time sufficient to produce a 3-amino-s-triazolo[3,4-a]isoquinoline. The time for maximum conversion of the 1-hydrazinoisoquinoline can vary widely, for instance, from about ½ hour to as much as 24 hours, or longer, depending upon factors such as temperature, nature of reactants, and the like. When the reaction is carried out in refluxing water, the temperature will be about 100° C. However, other inert solvents can be used in addition to, or in place of, water. Such solvents include ethanol, isopropyl alcohol, n-butanol, ethyl acetate, methyl ethyl ketone, and the like. The reaction temperature can also vary, for example, temperatures of from about 75° C. to about 125° C., and higher, can be used.

The product can be recovered by conventional procedures, such as by filtering the reaction mixture, cooling to precipitate the product, and purifying by recrystallizing from a convenient solvent such as water, ethanol, or the like, in which the product is sparingly soluble at elevated temperatures and rather insoluble at low temperatures.

An additional aspect of the invention provides a process which comprises reacting a 1-chloroisoquinoline with 5-aminotetrazole at a temperature and for a period of time sufficient to produce a 3-amino-s-triazolo[3,4-a]isoquinoline.

5-aminotetrazole is a known compound which has been reported by Stolle, Ber. 62, 1120.

The reaction can be carried out simply by fusing a mixture of 5-aminotetrazole with the 1-chloroisoquinoline under an inert atmosphere such as nitrogen. Approximately equimolar proportions of the reactants can be used, although the use of a stoichiometric excess of 5-aminotetrazole will reduce the incidence of side reactions in some cases. The reaction temperature can be from about 90° C., and lower, to about 140° C., and higher. The exothermic reaction proceeds very rapidly. Therefore, maximum yields will be obtained in a few minutes, for instance, from about 3 to about 15 minutes. The 3-amino-s-triazolo[3,4-a]isoquinoline can be recovered as the hydrochloride salt by extraction from the reaction mixture with water, followed by recrystallization with a small quantity of water. The pure compound can, of course, be obtained by neutralization of the hydrochloride salt with sodium bicarbonate. In order to avoid side reactions, it is preferred that the 1-chloroisoquinoline used in this process not have other chloro or halo substituents.

A still further aspect of the invention provides a process which comprises reacting a 1-hydrazinoisoquinoline with cyanogen bromide for a period of time and at a temperature sufficient to prepare a 3-amino-s-triazolo[3,4-a]isoquinoline. The process can be carried out by reacting the reactants at approximately equimolar proportions in a mixture of water, an acid such as acetic acid, and a buffering agent such as sodium acetate. The reaction is preferably carried out at about room temperature or below for a period of from about 1 hour to about 30 hours. The product can be recovered by conventional procedures such as by filtering the reaction mixture, neutralizing the filtrate, and extracting the product from the neutralized filtrate with an organic liquid such as methylene dichloride, diethyl ether, or the like. The product can then be recovered by evaporating the extracting liquid.

In the four processes described above for producing the 3-amino-s-triazole[3,4-a]isoquinolines of the invention, conventional reaction equipment made from conventional, acid-resistant materials can be used.

Among the 3-amino-s-triazole[3,4-a]isoquinolines that are provided by the invention are the following compounds:

3-amino-s-triazolo[3,4-a]isoquinoline,
3-amino-5-chloro-s-triazolo[3,4-a]isoquinoline,
3-amino-6-chloro-s-triazolo[3,4-a]isoquinoline,
3-amino-6-chloro-5-methyl-s-triazolo[3,4-a]isoquinoline,
3-amino-6-chloro-5-phenyl-s-triazolo[3,4-a]isoquinoline,
3-amino-7-chloro-s-triazolo[3,4-a]isoquinoline,
3-amino-9-chloro-s-triazolo[3,4-a]isoquinoline,
3-amino-7-methoxy-s-triazolo[3,4-a]isoquinoline,
3-amino-5-(chloromethyl)-6-methyl-s-triazolo[3,4-a]isoquinoline,
3-amino-5,6-dimethyl-s-triazolo[3,4-a]isoquinoline,
3-amino-5-ethyl-6-phenyl-s-triazolo[3,4-a]isoquinoline,
3-amino-5-methyl-6-phenyl-s-triazolo[3,4-a]isoquinoline,
3-amino-6-nitro-s-triazolo[3,4-a]isoquinoline,
3-amino-5-methyl-6-cyano-s-triazolo[3,4-a]isoquinoline,
3-amino-6-ethoxy-s-triazolo[3,4-a]isoquinoline,
3-amino-6-butoxy-s-triazolo[3,4-a]isoquinoline,
3-amino-8-methoxy-s-triazolo[3,4-a]isoquinoline,
3-amino-9-methoxy-s-triazolo[3,4-a]isoquinoline,
3-amino-5-ethyl-s-triazolo[3,4-a]isoquinoline,
3-amino-7,8,9-trimethoxy-s-triazolo[3,4-a]isoquinoline,
3-amino-8,9-dimethoxy-s-triazolo[3,4-a]isoquinoline,
3-amino-5-methyl-s-triazolo[3,4-a]isoquinoline,
3-amino-6-carbethoxy-s-triazolo[3,4-a]isoquinoline,
3-amino-9-methyl-s-triazole[3,4-a]isoquinoline,
3-amino-8,9,10-trimethoxy-s-triazolo[3,4-a]isoquinoline,
3-amino-9-chloro-5-methyl-s-triazolo[3,4-a]isoquinoline,
3-amino-5-butyl-s-triazolo[3,4-a]isoquinoline,
3-amino-6-methyl-s-triazolo[3,4-a]isoquinoline,
3-amino-1,3-dioxolo[4,5-g]-s-triazole[3,4-a]isoquinoline

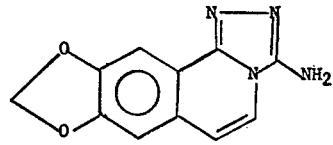

and the like, as well as the 5,6-dihydro derivatives of each of the above.

The 5,6 - dihydro - 3 - amino - s - triazolo[3,4-a]isoquinolines are produced in the following manner:

The compound to be hydrogenated is charged to a conventional pressure vessel, such as an autoclave, along with an inert solvent such as ethanol or isopropyl alcohol. A catalytic quantity of the hydrogenation catalyst is then added. Useful catalysts include nickel, palladium, or platinum deposited on charcoal, with palladium on charcoal being preferred. Useful catalytic quantities for one mole of the compound to be hydrogenated have been found to be from about 20 to 40 grams of a catalyst consisting of about 5 weight percent nickel, palladium or platinum on charcoal. (The weight refers to active metal catalyst plus charcoal, not to active metal catalyst alone.) The autoclave is then flushed with hydrogen, sealed, and hydrogen gas is injected to a pressure of, for instance, over 20 atmospheres and up to 100 atmospheres or more. The autoclave is shaken to saturate the mixture, and additional hydrogen is added to bring the pressure back up. The autoclave is then slowly heated from room temperature at a rate of, for example, about 20° C. per hour, and the pressure increase is plotted against time (or temperature). Before the hydrogenation reaction starts, the graph of pressure v. time or temperature will be very close to linear. The initiation of the hydrogenation reaction is detected by a somewhat lower rise than that which is extrapolated. When the reaction starts, heating is reduced and the temperature is allowed to increase by about 10° C. and it is there stabilized. At this temperature, the hydrogenation reaction rate will be about 0.01 mole per hour per gram of catalyst ("catalyst"

refers to active metal plus charcoal, when metal catalyst deposited on charcoal is used as the catalyst). Reaction rate would increase by a factor of about 2 for a 10° C. rise in temperature.

The hydrogenation reaction is normally carried out at temperatures within the range of from about 50° to 160° C., and preferably from about 80° C. to 110° C. The hydrogenation reaction is followed by observing the pressure decrease, when the pressure stops decreasing, the reaction has stopped.

Under the conditions described above, the hydrogenation is selective for the 5,6-position. Additional hydrogenation on the rings does not become significant until temperature is raised about 50° C. above the temperature at which reaction is first observed.

The hydrogenated product is recovered by standard procedures such as by filtration to separate the catalyst, evaporation of the solvent, and recrystallization from a convenient solvent such as ethanol, butanol, cyclohexane, benzene, ethanol/water, or the like. Yields are usually 80 percent or higher.

From the foregoing description of a convenient way for carrying out the hydrogenation reaction, it is seen that the hydrogenation process can be described as follows:

The process comprises reacting a 3-amino-s-triazolo [3,4-a]isoquinoline with hydrogen in the presence of a hydrogenation catalyst at a temperature within the range of from about 50° to about 160° C., and preferably from about 80° to about 110° C., for a period of time sufficient to hydrogenate the 5,6-position of said 3-amino-s-triazolo- [3,4-a]isoquinoline, provided that the reaction temperature employed is not more than about 50° C. higher, and preferably not more than 30° C. higher, than the temperature at which the hydrogenation reaction begins.

The compounds that are within the scope of the invention are illustrated by those that are represented by Formulas I and II:

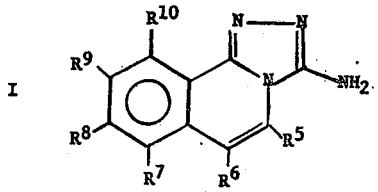

I wherein $R^5$, $R^6$, $R^7$, $R^8$, $R^9$ and $R^{10}$ individually can represent hydrogen, chloro, alkyl, phenyl, carbalkoxy, alkoxy, chloroalkyl, cyano, nitro, two of the R variables joined together to form a 5- or 6-membered carbocyclic ring or a 5- or 6-membered heterocyclic ring containing from one to two oxygen or nitrogen atoms, and the like. Normally, the substituent groups individually will contain not more than 12 carbon atoms, and preferably not more than 6 carbon atoms.

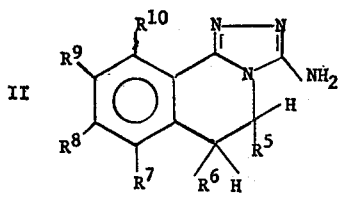

II

In Formula II, the several R variables have the significance stated above with respect to Formula I.

The preferred compounds include 3-amino-s-triazolo- [3,4-a]isoquinoline and the chloro-substituted-3-amino-s-triazolo[3,4-a]isoquinolines. Also preferred are the methoxy-3-amino-s-triazolo[3,4-a]isoquinolines and the lower alkyl-3-amino-s-triazolo[3,4 - a]isoquinolines wherein the alkyl has up to four carbon atoms, and the 5,6-dihydro derivatives of all of these compounds.

The 3-amino-s-triazolo[3,4-a]isoquinolines and 5,6-dihydro derivatives thereof of the invention are useful compounds. Because they have two reactive hydrogens in the amino group, they are useful in the plastic and resin arts. For instance, 3-amino-s-triazolo[3,4-a]isoquinolines and the 5,6-dihydro derivatives thereof can be reacted with propylene oxide to prepare diols useful for reaction with organic polyisocyanates for making urethane polymers of known utility. The 3-amino-s-triazolo[3,4-a]isoquinolines and 5,6-dihydro-derivatives thereof can be used as reactive catalysts in the production of polyepoxide plastics of known utility. 3-amino-s-triazolo[3,4-a]isoquinolines and 5,6-dihydro derivatives are useful as corrosion inhibitors in aqueous ethylene glycol-based cooling liquids. The 3-amino-s-triazolo[3,4-a]isoquinolines and 5,6-dihydro derivatives can be reacted with ethylene oxide to form surface active agents useful as wetting agents, detergents, and the like. They are also useful in research as reaction intermediates for the production of other new compounds.

The following examples illustrate the invention:

EXAMPLE 1

(A) 3-(N-benzoylamino)-s-triazolo[3,4-a]isoquinoline

To a solution of 40 grams of triethylamine in 100 ml. ethyl acetate were added simultaneously dropwise within half an hour 6 grams of 1-hydrazino-isoquinoline in 1 liter of ethylacetate and 20.2 grams of dichloromethylene benzamide in 100 ml. ethyl acetate from two separate dropping funnels. After the addition, the mixture was heated to 70° C. for 10 minutes, then cooled down to room temperature. The precipitate was filtered, washed with ethyl acetate and water and crystallized in pyridine. M.P. 265–267° C. Yield: 4.5 grams Elemental analysis.—Calcd. (percent): C, 70.82; H, 4.20; N, 19.44. Found (percent): C, 70.64; H, 4.14; N, 19.50.

(B) 3-amino-s-triazolo[3,4-a]isoquinoline 1 gram of 3-(N-benzoylamino) - s - triazolo[3,4-a]isoquinoline was dissolved in 50 ml. of 6 N—HCl and the mixture was refluxed for 2 hours. After cooling, it was neutralized with sodium bicarbonate, the amine was extracted with diethyl ether, and after evaporation of the latter the residue was pure 3-amino-s-triazolo[3,4-a]isoquinoline. Yield: 0.35 gram. M.P. 277° C. Identified by I.R.-spectrum.

EXAMPLE 2

3-amino-s-triazolo[3,4-a]isoquinoline

A suspension of 15.9 grams of 1-hydrazinoisoquinoline in a solution of 18.8 grams of S-methyl-thiouronium sulfate in 300 ml. water was heated with stirring for 20 hours at reflux. The hot solution was then filtered and the product crystallized in the filtrate. It was filtered and crystallized in water. M.P. 277°–278° C. (decomp.). Yield: 8.2 grams (44.5%).

Elemental analysis.—Calcd. (percent): C, 65.20; H, 4.38; N, 30.42. Found (percent): C, 64.98; H, 4.34; N, 30.44.

EXAMPLE 3

3-amino-6-chloro-s-triazolo[3,4-a]isoquinoline was prepared by a procedure analogous to Example 2 from 9.68 grams of 4-chloro-1-hydrazinoisoquinoline and 9.4 grams of S-methyl-thiouronium sulfate in 300 ml. water/ethanol, 1:1. M.P. 246–251° C. (dec.). Yield: 4.8 grams (44%). Transition point at 130°.

Elemental analysis.—Calcd. (percent): C, 54.94; H, 3.21; N, 25.63. Found (percent): C, 53.91; H, 3.21; N, 26.27.

EXAMPLE 4

Two grams of 5-aminotetrazole and 3.86 grams of 1-chloro-isoquinoline were fused together at 120° C. in a nitrogen atmosphere. An exothermic reaction took place with evolution of nitrogen. The heating was continued for 5 minutes at 120° C. and the cooled reaction product was extracted several times with boiling water. The water extract was evaporated and the residue crystallized in a small quantity of water. The hydrochloride of 3-amino-s-triazolo[3,4-a]isoquinoline which was obtained contained half a mol of crystal water. M.P. 277–278° C. Yield: 0.3 gram (10.5%).

Elemental analysis of the hydrochloride.—Calcd. (percent): C, 52.29; H, 4.39; N, 24.39. Found (percent): C, 52.11; H, 4.25; N, 24.40.

The water insoluble residue was then extracted several times with boiling ethanol. The ethanolic solution was evaporated and the residue crystallized in acetonitrile. M.P. 278–279° C. Yield: 1.1 g. (20.9%).

Elemental analysis.—Calcd. (percent): C, 73.20; H, 4.21; N, 22.38. Found (percent): C, 73.46; H, 4.12; N, 22.24.

This material was identified as 3-(1-isoquinolylamino)-s-triazolo[3,4-a]isoquinoline.

EXAMPLE 5

5.16 grams of 1-hydrazinoisoquinoline were dissolved in a mixture of 87 ml. of water, 25 grams of acetic acid and 33.2 grams of sodium acetate and then 3.6 grams of cyanogen bromide were added. After standing at room temperature and stirring for 24 hours, the reaction mixture was filtered and the filtrate was neutralized with sodium hydroxide. The neutral solution was extracted with methylene dichloride. After the evaporation of the solvent, the oily residue was treated with conc. HCl whereby the product became partially crystalline. The crystals were filtered and crystallized in ethanol. The yield of the hydrochloride of 3-amino-s-triazolo[3,4-a]isoquinoline was 0.5 gram (6.7%). M.P. 277–278° C.

From the oily residue traces of 1-semicarbazido isoquinoline were obtained by treating with a base. M.P. 185–187° C.

Elemental analysis of 1-semicarbazido-isoquinoline.—Calcd. (percent): C, 59.40; H, 4.99; N, 27.71; O, 7.91. Found (percent): C, 59.43; H, 5.02; N, 27.83; O, 7.99.

The 3-amino-s-triazolo[3,4-a]isoquinolines are hydrogenated to 5,6-dihydro-3-amino-s-triazolo[3,4-a]isoquinolines by procedures that are analogous to the following standardized conditions:

STANDARDIZED HYDROGENATION CONDITIONS

To a 250-milliliter autoclave is charged 0.05 mole of the 3-amino-s-triazolo[3,4-a]isoquinoline to be hydrogenated, 100 milliliters of isopropyl alcohol, and 1.5 gram of 5 weight percent palladium on charcoal (Type 16, from Jefferson Mabbluy and Co.). The autoclave is flushed with hydrogen, sealed and filled with hydrogen at room temperature to a pressure of about 80 atmospheres. The autoclave is then shaken in order to saturate the liquid, and additional hydrogen is added to restore the pressure to 80 atmospheres. The autoclave is slowly heated (at a rate of about 20° C. per hour) and the pressure increase is plotted against time. The beginning of the reaction is detected by a somewhat slower pressure rise than that which is extrapolated. The temperature is allowed to increase to about 10° C. higher than the temperature at which the reaction is first detected. The contents of the autoclave are then held at that temperature until the hydrogenation pressure stops decreasing. The autoclave is then cooled and vented, and the solvent is evaporated after filtering out the catalyst. Purification of the product, if necessary, is done by recrystallization.

EXAMPLE 6

3-amino-s-triazolo[3,4-a]isoquinoline is hydrogenated to 5,6-dihydro-3-amino-s-triazolo[3,4-a]isoquinoline by a procedure analogous to that described in the standardized conditions.

What is claimed is:
1. Compound selected from the group consisting of 3-amino-s-triazolo[3,4-a]isoquinoline or 6-chloro-3-amino-s-triazolo[3,4-a]isoquinoline.

References Cited

UNITED STATES PATENTS

| | | | |
|---|---|---|---|
| 2,425,320 | 8/1947 | Hill | 260—247 X |
| 2,719,158 | 9/1955 | Druey | 260—288 X |
| 2,817,682 | 12/1957 | Ratz | 260—308 X |
| 2,887,378 | 5/1959 | Williams | 260—308 X |
| 2,891,862 | 6/1959 | Van Allan | 260—308 X |
| 3,023,241 | 2/1962 | Twelves | 260—308 X |
| 3,183,241 | 5/1965 | Oja | 260—308 |
| 3,354,164 | 11/1967 | Francis | 260—288 |
| 3,388,130 | 6/1968 | Pesson | 260—288 X |

DONALD G. DAUS, Primary Examiner

U.S. Cl. X.R.

252—390; 260—283 CN, 283 SY, 287 R, 308 D, 454, 552 R, 558 R, 561 R, 690